United States Patent
Zhang et al.

(10) Patent No.: US 11,061,790 B2
(45) Date of Patent: *Jul. 13, 2021

(54) PROVIDING INSIGHT OF CONTINUOUS DELIVERY PIPELINE USING MACHINE LEARNING

(71) Applicant: International Business Machines Corporation, Armonk, NY (US)

(72) Inventors: Bo Zhang, Cary, NC (US); Alexander Sobran, Chapel Hill, NC (US); Bradley C. Herrin, Apex, NC (US); Xianjun Zhu, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 65 days.

This patent is subject to a terminal disclaimer.

(21) Appl. No.: 16/241,735

(22) Filed: Jan. 7, 2019

(65) Prior Publication Data

US 2020/0218622 A1 Jul. 9, 2020

(51) Int. Cl.
| | |
|---|---|
| *G06F 9/44* | (2018.01) |
| *G06F 11/22* | (2006.01) |
| *G06N 7/00* | (2006.01) |
| *G06N 20/00* | (2019.01) |
| *G06F 8/60* | (2018.01) |
| *G06F 8/658* | (2018.01) |

(52) U.S. Cl.
CPC ............ *G06F 11/2257* (2013.01); *G06F 8/60* (2013.01); *G06F 8/658* (2018.02); *G06N 7/005* (2013.01); *G06N 20/00* (2019.01)

(58) Field of Classification Search
None
See application file for complete search history.

(56) References Cited

U.S. PATENT DOCUMENTS

| | | |
|---|---|---|
| 9,740,478 B2 | 8/2017 | Doganata et al. |
| 9,921,952 B2 | 3/2018 | Dean et al. |
| | (Continued) | |

OTHER PUBLICATIONS

List of IBM Patents or Patent Applications Treated as Related, Jul. 9, 2019, pp. 1-2.

(Continued)

*Primary Examiner* — Insun Kang
(74) *Attorney, Agent, or Firm* — Robert A. Voigt, Jr.; Winstead PC (57) ABSTRACT

A method, system and computer program product for detecting potential failures in completing a continuous delivery (CD) pipeline using machine learning. A CD pipeline is defined to include stages, where each stage includes a binary event(s). A model is created by applying an Apriori algorithm and a sequential pattern mining algorithm to a set of previous patterns of sequences of binary events to calculate confidence scores for completing a set of binary events in a particular order. After identifying an ongoing CD sequence (ordered set of binary events) for a software application, the model is used to predict a likelihood of the ongoing CD sequence for the software application completing the CD pipeline by generating confidence score(s) for the ongoing CD sequence. A notification is issued regarding a potential failure in completing the CD pipeline for the software application if a confidence score is below a threshold value.

16 Claims, 3 Drawing Sheets

(56) References Cited

U.S. PATENT DOCUMENTS

| | | | | |
|---|---|---|---|---|
| 2016/0034270 | A1* | 2/2016 | Swierc | G06F 11/3668 717/126 |
| 2016/0321169 | A1* | 11/2016 | Chacko | G06F 11/3684 |
| 2016/0350203 | A1 | 12/2016 | Doganata et al. | |
| 2016/0357660 | A1 | 12/2016 | Dean et al. | |
| 2017/0039126 | A1* | 2/2017 | Wood | G06F 11/3628 |
| 2017/0124487 | A1* | 5/2017 | Szeto | G06N 20/00 |
| 2017/0371636 | A1 | 12/2017 | Palavalli et al. | |
| 2018/0032322 | A1 | 2/2018 | Jagannath et al. | |
| 2018/0107583 | A1* | 4/2018 | Champlin-Scharff | G06F 11/368 |
| 2019/0034826 | A1* | 1/2019 | Ahmad | G06N 20/00 |
| 2019/0057014 | A1* | 2/2019 | Shalev | G06F 11/368 |
| 2019/0057095 | A1* | 2/2019 | Chakravarti | G06N 5/022 |
| 2019/0129701 | A1* | 5/2019 | Hawrylo | G06F 8/65 |
| 2019/0129712 | A1* | 5/2019 | Hawrylo | G06F 8/71 |
| 2019/0163680 | A1* | 5/2019 | Mizoguchi | G06F 16/2474 |
| 2019/0188381 | A9* | 6/2019 | Zhao | G06N 3/0445 |
| 2019/0279102 | A1* | 9/2019 | Cataltepe | G06N 3/0454 |
| 2019/0294525 | A1* | 9/2019 | Scheiner | G06F 11/3608 |
| 2019/0312800 | A1* | 10/2019 | Schibler | G06F 9/45558 |
| 2019/0332369 | A1* | 10/2019 | Gupta | G06F 8/60 |
| 2019/0392075 | A1* | 12/2019 | Han | G06F 16/285 |
| 2020/0012963 | A1* | 1/2020 | Johnston | G06N 5/04 |
| 2020/0019393 | A1* | 1/2020 | Vichare | G06N 20/00 |
| 2020/0034749 | A1* | 1/2020 | Kumar | G06F 16/93 |
| 2020/0050443 | A1* | 2/2020 | Edelsten | H04L 67/34 |
| 2020/0050935 | A1* | 2/2020 | Edelsten | G06F 8/71 |

OTHER PUBLICATIONS

TechBeacon, https://techbeacon.com/10-ways-machine-learning-can-optimize-devops, 2018, pp. 1-16.

Andi Mann, "Applying Machine Learning to DevOps," ECS Digital, https://www.ecs-digital.co.uk/blog/applying-machine-learning-to-devops, Jun. 6, 2017, pp. 1-11.

Amir Kalron, "The State of Machine Learning in DevOps," https://dzone.com/articles/the-state-of-machine-learning-in-devops, DEEZone DevOps, Jan. 25, 2018, pp. 1-5.

Maartens Lourens, "A Pragmatic Introduction to Machine Learning for DevOps Engineers," OpenCredo, https://ppencredo.com/a-pragmatic-introduction-to-machine-learning-for-devops-engineers, Jan. 23, 2018, pp. 1-19.

Xu et al., "Crying Wolf and Meaning it: Reducing False Alarms in Monitoring of Sporadic Operations through POD-Monitor," 2015 IEEE/ACM 1st International Workshop on Complex Faults and Failures in Large Software Systems, 2015, pp. 69-75.

Sun et al. "Non-Intrusive Anomaly Detection With Streaming Performance Metrics and Logs for DevOps in Public Clouds: A Case Study in AWS," IEEE Transactions on Emerging Topics in Computing, Jun. 8, 2016, vol. 4, No. 2, pp. 278-289.

Staples et al., "Continuous Validation for Data Analytics Systems," 2016 IEEE/ACM 38th IEEE International Conference on Software Engineering Companion, Austin, Texas, May 14-22, 2016, pp. 769-772.

Office Action for U.S. Appl. No. 16/504,860 dated Aug. 20, 2020, pp. 1-29.

* cited by examiner

PROVIDING INSIGHT OF CONTINUOUS DELIVERY PIPELINE USING MACHINE LEARNING

TECHNICAL FIELD

The present invention relates generally to continuous delivery, and more particularly to providing insight of the continuous delivery pipeline using machine learning.

BACKGROUND

Continuous delivery is a software engineering approach in which teams produce software in short cycles, ensuring that the software can be reliably released at any time. It aims at building, testing, and releasing software with greater speed and frequency. The approach helps reduce the cost, time, and risk of delivering changes by allowing for more incremental updates to applications in production. A straightforward and repeatable deployment process is important for continuous delivery.

Continuous delivery is enabled through the deployment pipeline. That is, the continuous delivery pipeline enables a constant flow of changes into production via an automated software production line.

The pipeline breaks down the software delivery process into stages, such as build and test. Each stage is aimed at verifying the quality of new features from a different angle to validate the new functionality and prevent errors from affecting the software. The pipeline should provide feedback to the team and visibility into the flow of changes to everyone involved in delivering the new feature/s.

A failure in a particular stage of the continuous delivery pipeline that prevents the completion of the continuous delivery pipeline may have been caused or correlated to issues or failures in a previous stage(s).

SUMMARY

In one embodiment of the present invention, a method for detecting potential failures in completing a continuous delivery pipeline using machine learning comprises defining the continuous delivery pipeline comprising a plurality of stages, where each of the plurality of stages comprises one or more binary events. The method further comprises creating a model by applying a sequential pattern mining algorithm to a set of previous patterns of sequences of binary events to calculate confidence scores for completing a set of binary events in a particular order. The method additionally comprises identifying an ongoing continuous delivery sequence for a software application, where the ongoing continuous delivery sequence comprises an ordered set of binary events and their respective values. Furthermore, the method comprises predicting a likelihood that the ongoing continuous delivery sequence for the software application completes the continuous delivery pipeline using one or more confidence scores generated by the model for the ongoing continuous delivery sequence. Additionally, the method comprises issuing a notification regarding a potential failure in completing the continuous delivery pipeline for the software application in response to one or more of the one or more confidence scores generated by the model being below a threshold value.

Other forms of the embodiment of the method described above are in a system and in a computer program product.

The foregoing has outlined rather generally the features and technical advantages of one or more embodiments of the present invention in order that the detailed description of the present invention that follows may be better understood. Additional features and advantages of the present invention will be described hereinafter which may form the subject of the claims of the present invention.

BRIEF DESCRIPTION OF THE DRAWINGS

A better understanding of the present invention can be obtained when the following detailed description is considered in conjunction with the following drawings, in which.

DETAILED DESCRIPTION

The present invention comprises a method, system and computer program product for detecting potential failures in completing a continuous delivery pipeline using machine learning. In one embodiment of the present invention, a continuous delivery pipeline is defined to include stages, where each stage includes one or more binary events. A continuous delivery pipeline breaks down the software delivery process into stages. The continuous delivery pipeline may be defined as containing a designated number of stages, such as four (e.g., code, build, test and deploy). "Binary events," as used herein, refer to an outcome (e.g., build duration longer than the average duration) that results from implementing a stage (e.g., build) in the continuous delivery pipeline. A model is created by applying an Apriori algorithm and a sequential pattern mining algorithm to a set of previous patterns of sequences of binary events to calculate confidence scores for completing a set of binary events in a particular order. An Apriori algorithm, as used herein, refers to an algorithm that identifies frequently occurring binary events. The Apriori algorithm is an algorithm for frequent item set mining and association rule learning. A sequential pattern mining algorithm, as used herein, refers to an algorithm (e.g., PrefixSpan) that finds statistically relevant patterns of sequences of binary events. Such an algorithm analyzes the data generated in each stage of the pipeline. The algorithm will be able to reveal the relationships between data metrics that are not in the same stage and not directly connected. A "confidence score," as used herein, refers to a value that indicates how likely the continuous delivery process will continue to a subsequent stage in the continuous delivery pipeline following the occurrence of an ordered set of binary events in completed stages of the continuous delivery pipeline. After identifying an ongoing continuous delivery sequence for a software application, where the ongoing continuous delivery sequence includes an ordered set of binary events and their respective values, the model is used to predict a likelihood that the ongoing continuous delivery sequence for the software application completes a subsequent stage(s) of the continuous delivery pipeline by generating confidence score(s) for the ongoing continuous delivery sequence. A notification is then issued to a team member (e.g., software developer) regarding a potential failure in completing the continuous delivery pipeline for the software application if one or more of the confidence score(s) generated by the model is below a threshold value. In such a notification, the team member may be notified of the binary event(s) to check that may be the cause of a potential failure in completing the continuous delivery pipeline for the software application. In this manner, the team members (e.g., software developer) are informed of situations where a failure in completing the continuous delivery pipeline is likely. Failures in completing the pipeline may now be detected prior to the actual occurrence of the failure.

In the following description, numerous specific details are set forth to provide a thorough understanding of the present invention. However, it will be apparent to those skilled in the art that the present invention may be practiced without such specific details. In other instances, well-known circuits have been shown in block diagram form in order not to obscure the present invention in unnecessary detail. For the most part, details considering timing considerations and the like have been omitted inasmuch as such details are not necessary to obtain a complete understanding of the present invention and are within the skills of persons of ordinary skill in the relevant art.

Figure 1:
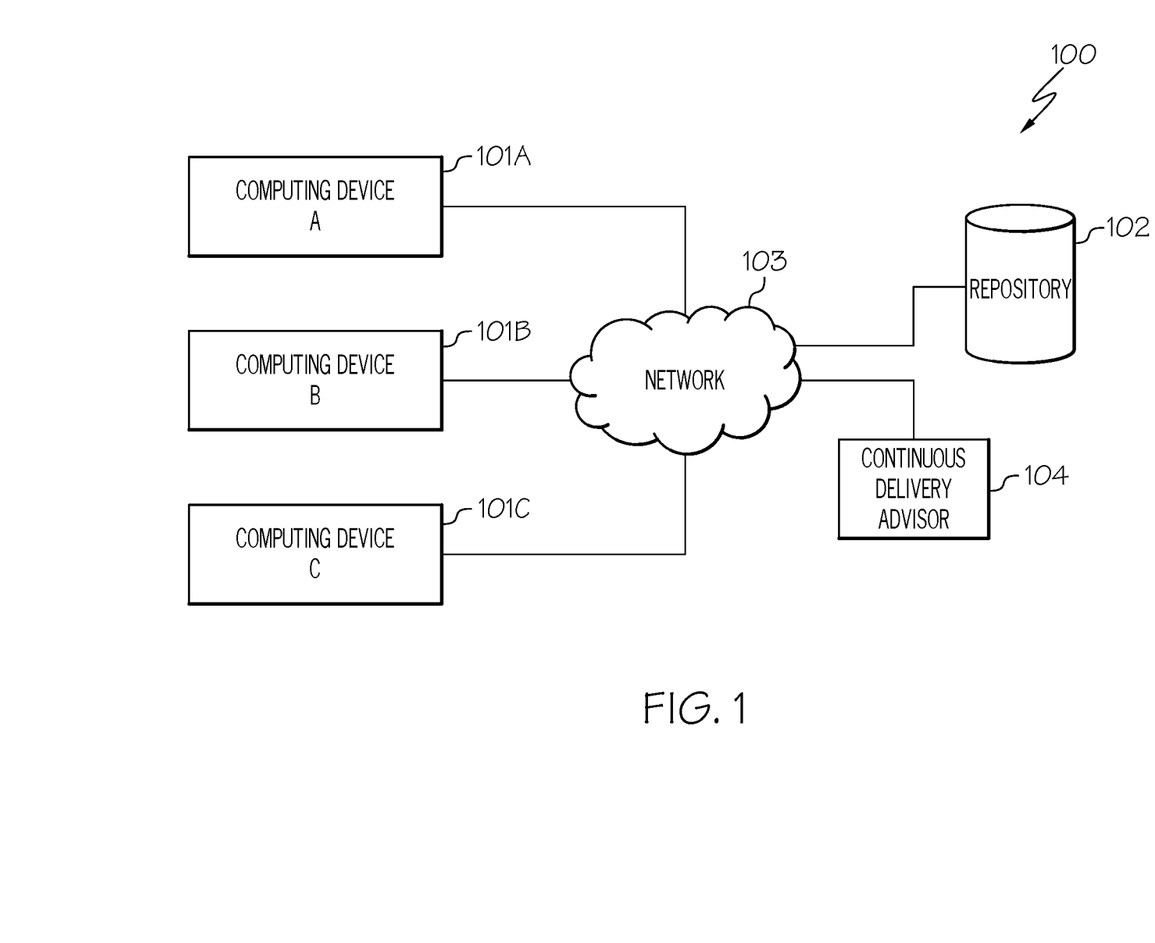
FIG. 1 illustrates a communication system for practicing the principles of the present invention in accordance with an embodiment of the present invention.

Referring now to the Figures in detail, FIG. 1 illustrates an embodiment of the present invention of a communication system 100 for practicing the principles of the present invention in accordance with an embodiment of the present invention. Communication system 100 includes computing devices 101A-101C (identified as "Computing Device A," "Computing Device B," and "Computing Device C," respectively, in FIG. 1) connected to a repository 102 via a network 103. Computing devices 101A-101C may collectively or individually be referred to as computing devices 101 or computing device 101, respectively. It is noted that both computing devices 101 and the users of computing devices 101 may be identified with element number 101.

Users of computing devices 101 may correspond to the developers, testers, operations engineers, etc. that are members of a team(s) involved in producing software. Such members may produce software using software engineering approaches referred to as "continuous integration" and "continuous delivery." Continuous integration is a software development practice in which small adjustments to the underlying code in an application are tested every time a team member makes changes. In a continuous integration environment, developers (e.g., users of computing devices 101) merge their code changes in a shared repository 102 several times a day so that it can be committed, tested, and validated continuously. That is, when developers (e.g., users of computing devices 101) are finished making changes to an application, they commit their code to a shared repository 102 which will then integrate their snippet with the central code base.

In the same vein, the practice of continuous delivery further extends continuous integration by making sure the software checked in on the mainline is always in a state that can be deployed to users and makes the actual deployment process very rapid. Continuous delivery is a software engineering approach in which teams produce software in short cycles, ensuring that the software can be reliably released at any time. It aims at building, testing, and releasing software with greater speed and frequency. The approach helps reduce the cost, time, and risk of delivering changes by allowing for more incremental updates to applications in production. A straightforward and repeatable deployment process is important for continuous delivery.

Continuous delivery is enabled through the deployment pipeline. That is, the continuous delivery pipeline enables a constant flow of changes into production via an automated software production line. The pipeline breaks down the software delivery process into stages, such as build and test. Each stage is aimed at verifying the quality of new features from a different angle to validate the new functionality and prevent errors from affecting the software. The pipeline should provide feedback to the team and visibility into the flow of changes to everyone involved in delivering the new feature/s.

Referring to FIG. 1, computing device 101 may be any type of computing device (e.g., portable computing unit, Personal Digital Assistant (PDA), laptop computer, mobile device, tablet personal computer, smartphone, mobile phone, navigation device, gaming unit, desktop computer system, workstation, Internet appliance and the like) configured with the capability of connecting to network 103 and consequently communicating with other computing devices 101 and repository 102.

Network 103 may be, for example, a local area network, a wide area network, a wireless wide area network, a circuit-switched telephone network, a Global System for Mobile Communications (GSM) network, a Wireless Application Protocol (WAP) network, a WiFi network, an IEEE 802.11 standards network, various combinations thereof, etc. Other networks, whose descriptions are omitted here for brevity, may also be used in conjunction with system 100 of FIG. 1 without departing from the scope of the present invention.

System 100 further includes what is referred to herein as a "continuous delivery advisor" 104 connected to network 103 by wire or wirelessly. Continuous delivery advisor 104 is configured to provide insight of the continuous delivery pipeline using machine learning. In particular, continuous delivery advisor 104 generates confidence scores which predict the likelihood of a software application completing a subsequent stage(s) of the continuous delivery pipeline after one or more stages in the continuous delivery pipeline have been completed. Such confidence scores are generated by using a model that was created by applying an Apriori algorithm and a sequential pattern mining algorithm to a set of previous patterns of sequences of events (referred to herein as "binary events"). Based on the prediction, team members 101 may be notified to check questionable binary events. Furthermore, the notification may include the sequence of events that occurred and the confidence of that sequence continuing to the next stage(s) of the pipeline thereby informing team member 101 of a possible intervention strategy. Such a notification is used to recommend modifications to the continuous delivery sequence. A more detailed description of continuous delivery advisor 104 providing insight of the continuous delivery pipeline using machine learning is provided further below. A description of the hardware configuration of continuous delivery advisor 104 is provided below in connection with FIG. 2.

System 100 is not to be limited in scope to any one particular network architecture. System 100 may include any number of computing devices 101, repositories 102, networks 103 and continuous delivery advisor 104. Furthermore, while FIG. 1 illustrates continuous delivery advisor 104 as being a separate physical device, some or all of the functionality of continuous delivery advisor 104 may reside in computing device 101.

Figure 2:
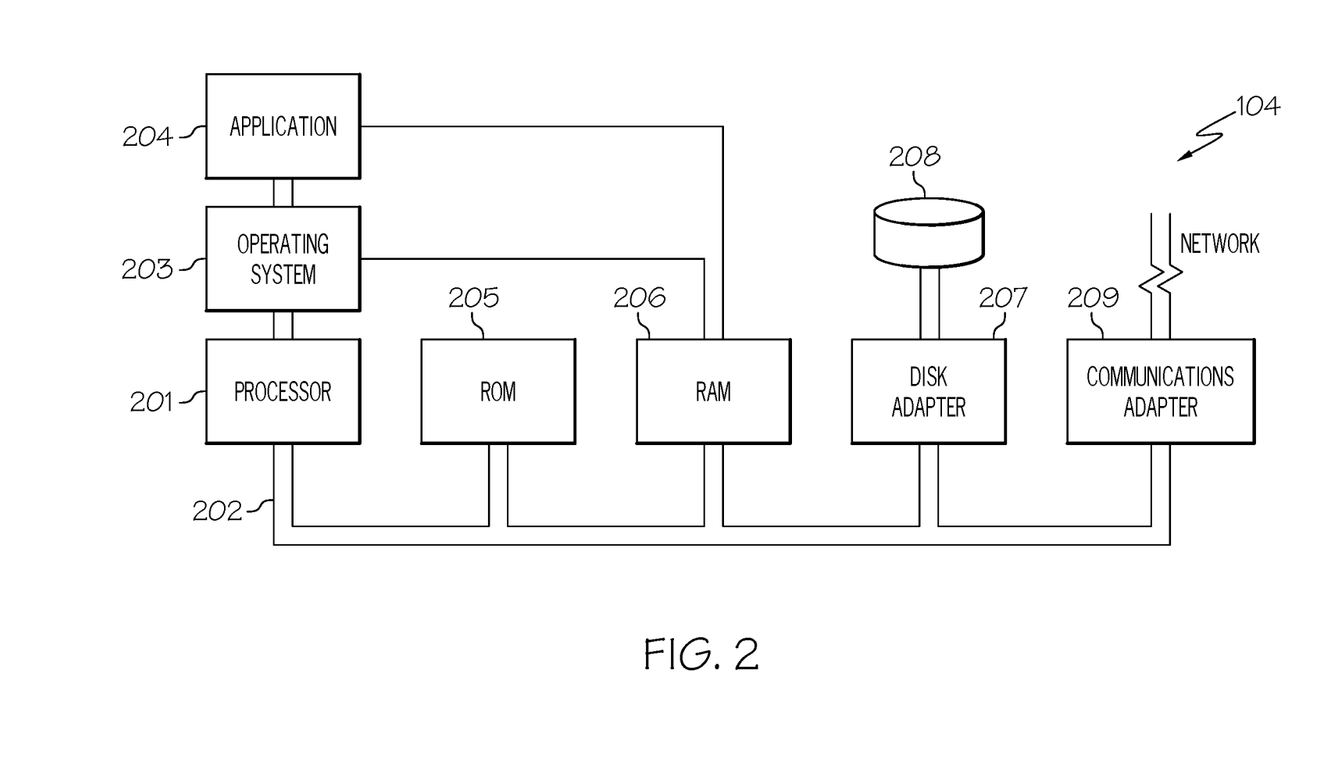
FIG. 2 illustrates an embodiment of the present invention of a hardware configuration of a continuous delivery advisor which is representative of a hardware environment for practicing the present invention.

Referring now to FIG. 2, FIG. 2 illustrates a hardware configuration of continuous delivery advisor 104 (FIG. 1) which is representative of a hardware environment for practicing the present invention. Referring to FIG. 2, continuous delivery advisor 104 has a processor 201 coupled to various other components by system bus 202. An operating system 203 runs on processor 201 and provides control and coordinates the functions of the various components of FIG. 2. An application 204 in accordance with the principles of the present invention runs in conjunction with operating system 203 and provides calls to operating system 203 where the calls implement the various functions or services to be performed by application 204. Application 204 may include, for example, a program for detecting potential failures in completing a continuous delivery pipeline using machine learning as discussed below in association with FIG. 3.

Referring again to FIG. 2, read-only memory ("ROM") 205 is coupled to system bus 202 and includes a basic input/output system ("BIOS") that controls certain basic functions of continuous delivery advisor 104. Random access memory ("RAM") 206 and disk adapter 207 are also coupled to system bus 202. It should be noted that software components including operating system 203 and application 204 may be loaded into RAM 206, which may be continuous delivery advisor's 104 main memory for execution. Disk adapter 207 may be an integrated drive electronics ("IDE") adapter that communicates with a disk unit 208, e.g., disk drive. It is noted that the program for detecting potential failures in completing a continuous delivery pipeline using machine learning, as discussed below in association with FIG. 3, may reside in disk unit 208 or in application 204.

Continuous delivery advisor 104 may further include a communications adapter 209 coupled to bus 202. Communications adapter 209 interconnects bus 202 with an outside network (e.g., network 103 of FIG. 1) thereby allowing continuous delivery advisor 104 to communicate with computing devices 101 and repository 102.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

As stated in the Background section, continuous delivery is a software engineering approach in which teams produce software in short cycles, ensuring that the software can be reliably released at any time. It aims at building, testing, and releasing software with greater speed and frequency. The approach helps reduce the cost, time, and risk of delivering changes by allowing for more incremental updates to applications in production. A straightforward and repeatable deployment process is important for continuous delivery. Continuous delivery is enabled through the deployment pipeline. That is, the continuous delivery pipeline enables a constant flow of changes into production via an automated software production line. The pipeline breaks down the software delivery process into stages, such as build and test. Each stage is aimed at verifying the quality of new features from a different angle to validate the new functionality and prevent errors from affecting the software. The pipeline should provide feedback to the team and visibility into the flow of changes to everyone involved in delivering the new feature/s. A failure in a particular stage of the continuous delivery pipeline that prevents the completion of the continuous delivery pipeline may have been caused or correlated to issues or failures in a previous stage(s). There is, however, not currently a means for attempting to detect such a failure ahead of time.

The embodiments of the present invention provide a means for attempting to detect failures in the continuous delivery pipeline ahead of time based on generating confidence scores which predict the likelihood of a software application completing the continuous delivery pipeline after one or more stages in the continuous delivery pipeline have been completed as discussed below in connection with FIG. 3. As discussed further below, based on the prediction, a notification may be generated to a team member 101 regarding a potential failure in completing the continuous delivery pipeline for the software application. In such a notification, the team member may be notified of the binary event(s) to check that may be the cause of a potential failure in completing the continuous delivery pipeline for the software application thereby providing an opportunity to thwart a potential failure in the continuous delivery pipeline ahead of time.

Figure 3:
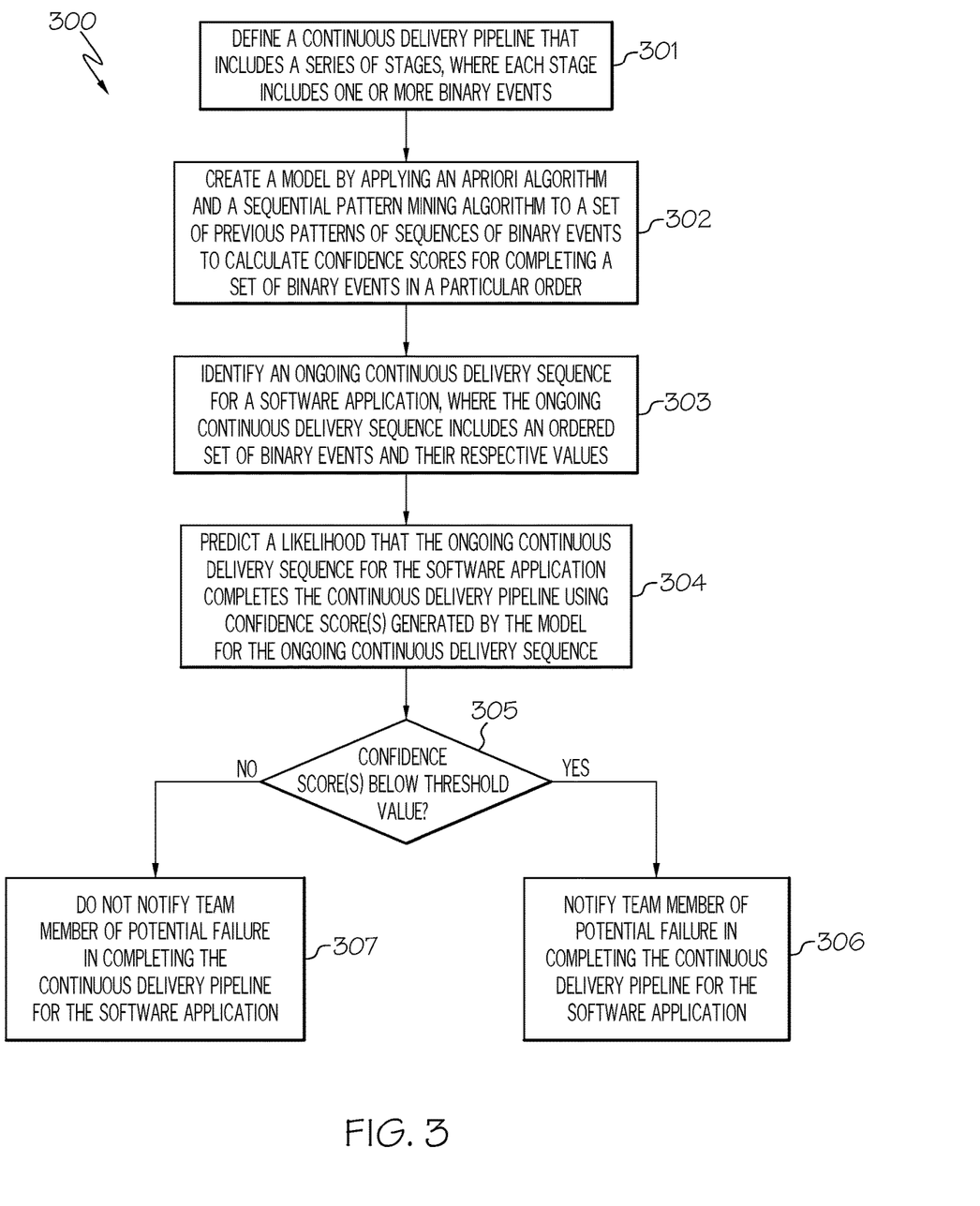
FIG. 3 is a flowchart of a method for detecting potential failures in completing a continuous delivery pipeline using machine learning in accordance with an embodiment of the present invention.

FIG. 3 is a flowchart of a method 300 for detecting potential failures in completing a continuous delivery pipeline using machine learning in accordance with an embodiment of the present invention.

Referring to FIG. 3, in conjunction with FIGS. 1-2, in step 301, continuous delivery advisor 104 defines a continuous delivery pipeline that includes a series of stages, where each stage includes one or more binary events. As previously discussed, a continuous delivery pipeline breaks down the software delivery process into stages. Continuous delivery advisor 104 defines the continuous delivery pipeline as containing a designated number of stages, such as four (e.g., code, build, test and deploy). "Binary events," as used herein, refer to an outcome that results from implementing a stage in the continuous delivery pipeline. For example, during the code stage (A) of the continuous delivery pipeline, the following binary events may occur: (A1) number of lines added being larger than the average added number of lines; (A2) recency of the committed files are longer than the average recency; (A3) frequency of the committed files larger than the average frequency; (A4) length of the commit message longer than the average length; (A5) code construct previously rejected in code-review; (A6) new package or library added, etc.

In another example, during the build stage (B) of the continuous delivery pipeline, the following binary events may occur: (B1) build duration longer than the average duration; (B2) build log longer than the average; (B3) build log containing some specific dependency installation error, etc.

In a further example, during the test stage (C) of the continuous delivery pipeline, the following binary events may occur: (C1) test duration longer than the average test duration; (C2) number of tests passed larger than the average; (C3) number of tests with a warning larger than the average; (C4) changed codes covered by unit testing, etc.

In another example, during the deploy stage (D) of the continuous delivery pipeline, the following binary events may occur: (D1) deploy duration longer than the average duration; (D2) deploy log longer than the average, etc.

In one embodiment, each of these binary events is detected by continuous delivery advisor 104, where an indication of the occurrence of such binary events is stored in repository 102. For example, the lines of code added/changed by a team member 101 may be detected by continuous delivery advisor 104 tracking the lines of code stored in repository 102. In another example, the recency and frequency of the committed files are detected by continuous delivery advisor 104 tracking when and how often a file is committed to repository 102. In a further example, the length of the commit message is determined based on detecting the number of characters in the commit message. In another example, all code constructs that were previously rejected in a code-review are stored in repository 102. In a further example, continuous delivery advisor 104 detects the addition of a new package or library to the code when stored in repository 102. In another example, continuous delivery advisor 104 detects the duration of the build as well as the length of the build log based on analyzing information from the build tool used during the build stage. Furthermore, continuous delivery advisor 104 detects whether the build log contains a dependency installation error, such as via natural language processing, which identifies keywords used in connection with dependency installation errors. Additionally, continuous delivery advisor 104 detects test duration, number of tests passed, number of tests with a warning and changed codes covered by unit testing based on analyzing information from the code testing software used during the test stage. Furthermore, continuous delivery advisor 104 detects the deploy duration and the length of the deploy log based on analyzing information from the software deployment tool used during the deploy stage.

Furthermore, continuous delivery advisor 104 may determine the average values of the various binary events discussed above (e.g., average number of lines of code added, average frequency of files being committed, average length of the commit message) based on identifying the average value of such an event that occurs over a period of time.

The principles of the present invention are not to be limited in scope to the binary events discussed above but may include any binary event that would be helpful in determining the likelihood of an ongoing continuation delivery sequence completing its continuous delivery pipeline without a failure. For example, other binary events may involve the developer's development environment, the defects which lead to the code commit, etc.

In step 302, continuous delivery advisor 104 creates a model by applying an Apriori algorithm and a sequential pattern mining algorithm to a set of previous patterns of sequences of binary events to calculate confidence scores for completing a set of binary events in a particular order. The set of previous patterns may include both patterns (sequence of binary events) that successfully completed the continuous delivery pipeline as well as those that did not successfully complete the continuous delivery pipeline. An Apriori algorithm, as used herein, refers to an algorithm that identifies frequently occurring binary events. The Apriori algorithm is an algorithm for frequent item set mining and association rule learning. An "item," as used herein, refers to the binary event which may be placed in an "item set." The Apriori algorithm proceeds by identifying the frequent individual items, such as in repository 102, and expanding them to larger and larger item sets as those item sets appear sufficiently often, such as in repository 102. The frequent item sets determined by the Apriori algorithm can be used to determine association rules which highlight general trends, such as in repository 102.

A sequential pattern mining algorithm, as used herein, refers to an algorithm (e.g., PrefixSpan) that finds statistically relevant patterns of sequences of binary events. Such an algorithm analyzes the data generated in each stage of the pipeline. The algorithm will be able to reveal the relationships between data metrics that are not in the same stage and not directly connected. For example, a statistically relevant pattern of a sequence of binary events may be A1, A3 and B2 (see discussion of binary events above), where such a pattern regularly occurs.

In one embodiment, the model is created based on placing each binary event in its own item set. Those events that do not occur frequently (above a threshold number of times, which may be user-specified) are filtered out based on identifying frequently occurring binary events by the Apriori algorithm. New candidate item sets are generated from the most recently created frequent items sets by finding supersets of the existing frequent item sets. All the candidate item sets are then tested to determine if the binary events are in a sequence using the sequential pattern mining algorithm. If the binary events are not in a sequence, then they are discarded. Otherwise, further new candidate item sets are generated until there are no more supersets. All of the discovered frequent item sets are then returned.

A confidence score of whether the next stage in the continuous delivery pipeline will occur is calculated by the model based on its association rule, such as in the form of X=>Y, where X (the antecedent stage) is any of the discovered frequent item sets (e.g., A1, A3, B2) before stage i, and Y (the consequent) is the following stage j of the continuous delivery pipeline, where j>i. The "confidence score," as used herein, refers to a value that indicates how likely the continuous delivery process will continue to the next stage in the continuous delivery pipeline following the occurrence of the binary events (e.g., A1, A3, B2) in the previously completed stages (e.g., stages A and B). In one embodiment, such a score is in the form of a percentage.

By developing such a model, developers will have a better understanding and insight of the continuous delivery pipeline. It will enable developers to not only have confidence scores for each stage finished to answer what could happen if the continuous discovery pipeline continued but also be able to provide developers questionable binary events to be checked. For example, if the binary events of A1, A4 and B1 at stage 2 (build) (see discussion of binary events above) occur (X={A1, A4, B1}) and the confidence scores are 45%, 40% to proceed with stages C (test) and D (deploy), respectively, and then after the binary event of C2 occurring (X={A1, A4, B1, C2}), the confidence score is 5% to proceed with stage D, then such a decreasing and low confidence score may indicate a likely unsuccessful completion of the pipeline. That is, a low confidence score may indicate a potential failure in the completion of the pipeline. The model may suggest to the member to check the event of B1 because B1 does not typically occur after A1 and A4.

In step 303, continuous delivery advisor 104 identifies an ongoing continuous delivery sequence for a software application, where the ongoing continuous delivery sequence includes an ordered set of binary events and their respective values. For example, continuous delivery advisor 104 identifies the ongoing continuous delivery sequence of A1, A3 and B2 (see discussion of binary events above) as well as their values.

In step 304, continuous delivery advisor 104 predicts a likelihood that the ongoing continuous delivery sequence for the software application completes the continuous delivery pipeline using the confidence score(s) generated by the model for the ongoing continuous delivery sequence. For example, as discussed above, continuous delivery advisor 104 generates a confidence score as to the likelihood of completing the next stage(s) of the continuous delivery pipeline using the model. For instance, if the ongoing continuous delivery sequence is A1, A4 and B1 at stage 2 (build) (X={A1, A4, B1}), then the model may indicate that the confidence scores are 45%, 40% to proceed with stages C (test) and D (deploy), respectively. It is noted that the number of confidence scores that are generated are based on the number of stages left to be completed in the continuous delivery pipeline. For example, if there were three more stages (e.g., stages C, D and E) to be completed in the continuous delivery pipeline, then continuous delivery advisor 104 may generate three confidence scores, one for each of the following stages.

In one embodiment, the confidence score is a percentage. The higher the percentage, the higher the likelihood that the stage associated with that confidence score will be completed after completing the ongoing continuous delivery sequence (i.e., after completing the binary events of the ongoing continuous delivery sequence). Conversely, the lower the percentage, the lower the likelihood that the stage associated with that confidence score will be completed after completing the ongoing continuous delivery sequence (i.e., after completing the binary events of the ongoing continuous delivery sequence). Such a low score may indicate a high likelihood in the failure of completing the continuous delivery pipeline. In this manner, potential failures in completing the pipeline may be detected prior to the actual occurrence of the failure.

In step 305, a determination is made by continuous delivery advisor 104 as to whether the confidence score(s) is below a threshold value, which can be user-specified. In one embodiment, if one or more of the confidence scores generated by the model is below a threshold value, then continuous delivery advisor 104 notifies team member 101 (e.g., developer) of a potential failure in completing the continuous delivery pipeline for the software application as discussed below. In one embodiment, the threshold value may be adjusted based on the stage in the continuous delivery pipeline for which the confidence score applies. That is, the determination may be made for each confidence score with respect to a unique threshold value.

If one or more of the confidence scores generated by the model is below a threshold value, then in step 306, continuous delivery advisor 104 notifies team member 101 (e.g., developer) of a potential failure in completing the continuous delivery pipeline for the software application. For example, the notification may include the binary events for the team member 101 to check that may be the cause of a potential failure in completing the continuous delivery pipeline for the software application. For instance, if the binary events of A1, A4 and B1 at stage 2 (build) (see discussion of binary events above) occur (X={A1, A4, B1}) and the confidence scores are 45%, 40% to proceed with stages C (test) and D (deploy), respectively, and then after the binary event of C2 occurring (X={A1, A4, B1, C2}), the confidence score is 5% to proceed with stage D which is below a threshold value of 10%, then team member 101 may be informed to check the event of B1 because B1 does not typically occur after A1 and A4. Furthermore, the notification may include the sequence of binary events that occurred (e.g., A1, A4, B1, C2) and the confidence of proceeding to the next stage (e.g., stage D), such as 5%. The sequence of events informs team member 101 of a possible intervention strategy.

In one embodiment, the notification includes the confidence score supported by a pull request comment that supplies the explanation of why and how the confidence score was generated along with a list of features (e.g., previous commit SHA (secure hash algorithm), build failure, production monitoring log) used to support the prediction that this code change has a strong relationship to production and/or pipeline failures.

In this manner, embodiments of the present invention provide the team members (e.g., developers) confidence scores to assist the team member in determining what could happen if the pipeline is continued as well as provide the questionable binary events/items to be checked to assist the team members in handling a situation where a failure in completing the continuous delivery pipeline is likely.

If, however, the confidence score(s) generated by the model are not below a threshold value, then, in step 307, continuous delivery advisor 104 does not notify the team member 101 of a potential failure in completing the continuous delivery pipeline for the software application. For example, if continuous delivery advisor 104 observes that X={A1, A3, B2} at stage 2 (build) and the confidence scores predicted are 95%, 93% to proceed with stages C (test) and D (deploy), respectively, which are above the threshold values of 15% and 10%, respectively, then such confidence scores suggest that the occurrence of these binary events are a good pattern that regularly occurs.

In this manner, the team members (e.g., software developers) are informed of situations where a failure in completing the continuous delivery pipeline is likely. Failures in completing the pipeline may now be detected prior to the actual occurrence of the failure.

Furthermore, in this manner, the functionality or capability of computing systems is improved by possibly preventing the failure of the continuous delivery pipeline from actually occurring. Additionally, the functionality or capability of computing systems is improved by preventing a team of software engineers from spending time and utilizing computing resources (e.g., processing resources) in attempting to identify and understand the failure in completing the continuous delivery pipeline. By reducing the amount of computing resources being utilized by software developers from identifying and understanding the failure in completing the continuous delivery pipeline, computing resources (e.g., processing resource) are more efficiently utilized.

Furthermore, the present invention improves the technology or technical field involving software development. As discussed above, the continuous delivery pipeline breaks down the software delivery process into stages, such as build and test. Each stage is aimed at verifying the quality of new features from a different angle to validate the new functionality and prevent errors from affecting the software. The pipeline should provide feedback to the team and visibility into the flow of changes to everyone involved in delivering the new feature/s. A failure in a particular stage of the continuous delivery pipeline that prevents the completion of the continuous delivery pipeline may have been caused or correlated to issues or failures in a previous stage(s). There is, however, not currently a means for attempting to detect such a failure ahead of time. The present invention improves such technology by creating a model by applying an Apriori algorithm and a sequential pattern mining algorithm to a set of previous patterns of sequences of binary events to calculate confidence scores for completing a set of binary events in a particular order. In this manner, confidence score(s) predicting the likelihood of the software application completing the ongoing continuous delivery pipeline can be determined thereby predicting the occurrence of a failure in completing the continuous delivery pipeline. In this manner, there is an improvement to the technology or technical field involving software development.

The technical solution provided by the present invention cannot be performed in the human mind or by a human using a pen and paper. That is, the technical solution provided by the present invention could not be accomplished in the human mind or by a human using a pen and paper in any reasonable amount of time and with any reasonable expectation of accuracy without the use of a computer.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The invention claimed is:

1. A computer program product for detecting potential failures in completing a continuous delivery pipeline using machine learning, the computer program product comprising a computer readable storage medium having program code embodied therewith, the program code comprising programming instructions for performing the following:

defining, by a continuous delivery advisor connected to a shared repository via a network, said continuous delivery pipeline comprising a plurality of stages, wherein each of said plurality of stages comprises one or more binary events, wherein said one or more binary events comprise an outcome that results from implementing a corresponding stage of said plurality of stages in said continuous delivery pipeline, the continuous delivery pipeline enabling a constant flow of changes made during the plurality of stages into production via an automated software production line;

detecting and storing, by said continuous delivery advisor, each of said one or more binary events in the continuous delivery pipeline by tracking an indication of the occurence of each of said one or more binary events that is stored in the repository;

creating, by said continuous delivery advisor, a model by applying an Apriori algorithm to identify item sets containing frequently occurring binary events in the repository, creating said model including applying a sequential pattern mining algorithm to find a statistically relevant set of previous patterns of sequences of said one or more binary events, wherein binary events are discarded in response to the binary events not being in sequence, wherein data generated in each stage of the continuous delivery pipeline is analyzed to calculate confidence scores for completing a set of binary events of the detected binary events in a particular order;

identifying, by said continuous delivery advisor, an ongoing continuous delivery sequence for a software application during each stage in the continuous delivery pipeline, wherein said ongoing continuous delivery sequence comprises an ordered set of binary events and their respective values;

predicting, by said continuous delivery advisor, a likelihood that said ongoing continuous delivery sequence for said software application completes said continuous delivery pipeline using one or more confidence scores generated by said model for said ongoing continuous delivery sequence, wherein a number of said one or more confidence scores corresponds to a number of stages left to be completed in said continuous delivery pipeline; and generating a notification including said one or more confidence scores and the set of binary events to be checked for a potential failure in completing the continuous delivery pipeline and issuing, by said continuous delivery advisor, the notification to a computing device connected to said continuous delivery advisor via the network regarding a potential failure in completing said continuous delivery pipeline for said software application in response to one or more of said one or more confidence scores generated by said model being below a threshold value.

2. The computer program product as recited in claim 1, wherein said plurality of stages comprises code, build, test and deploy stages.

3. The computer program product as recited in claim 1, wherein said set of previous patterns of sequences of binary events comprises patterns that successfully complete said continuous delivery pipeline.

4. The computer program product as recited in claim 1, wherein said set of previous patterns of sequences of binary events comprises patterns that did not successfully complete said continuous delivery pipeline.

5. The computer program product as recited in claim 1, wherein each of said one or more confidence scores generated by said model comprises a percentage.

6. The computer program product as recited in claim 1, wherein a binary event of each stage is one or more of the following: number of lines added being larger than an average added number of lines, recency of committed files longer than an average recency, frequency of committed files lager than an average frequency, length of a commit message longer than an average length, a code construct previously rejected in a code review, and a new package or library added.

7. The computer program product as recited in claim 1, wherein the program code further comprises the programming instructions for:

detecting a binary event using natural language processing.

8. The computer program product as recited in claim 1, wherein said notification comprises said one or more of said one or more confidence scores generated by said model being below said threshold value supported by a pull request comment.

9. A continuous delivery advisor, comprising:

a memory for storing a computer program for detecting potential failures in completing a continuous delivery pipeline using machine learning; and a processor connected to said memory, wherein said processor is configured to execute the program instructions of the computer program comprising:

defining said continuous delivery pipeline comprising a plurality of stages, wherein each of said plurality of stages comprises one or more binary events, wherein said one or more binary events comprise an outcome that results from implementing a corresponding stage of said plurality of stages in said continuous delivery pipeline, the continuous deliver pipeline enabling a constant flow of changes made during the plurality of stages into production via an automated software production line;

detecting and storing each of said one or more binary events in the continuous delivery pipeline by tracking an indication of the occurrence of each of said one or more binary events that is stored in the repository;

creating a model by applying an Apriori algorithm to identify item sets containing frequently occurring binary events in the repository, creating said model including applying a sequential pattern mining algorithm to find a statistically relevant set of previous patterns of sequences of said one or more binary events, wherein binary events are discarded in response continuous delivery pipeline is analyzed to calculate confidence scores for completing a set of binary events of the detected binary events in a particular order;

identifying an ongoing continuous delivery sequence for a software application during each stage in the continuous delivery pipeline, wherein said ongoing continuous delivery sequence comprises an ordered set of binary events and their respective values;

predicting a likelihood that said ongoing continuous delivery sequence for said software application completes said continuous delivery pipeline using one or more confidence scores generated by said model for said ongoing continuous delivery sequence, wherein a number of said one or more confidence scores corresponds to a number of stages left to be completed in said continuous delivery pipeline; and generating a notification including said one or more confidence scores and the set of binary events to be checked for a potential failure in completing the continuous delivery pipeline and issuing the notification to a computing device connected to said continuous delivery advisor via the network regarding a potential failure in completing said continuous delivery pipeline for said software application in response to one or more of said one or more confidence scores generated by said model being below a threshold value.

10. The continuous delivery advisor as recited in claim 9, wherein said plurality of stages comprises code, build, test and deploy stages.

11. The continuous delivery advisor as recited in claim 9, wherein said set of previous patterns of sequences of binary events comprises patterns that successfully complete said continuous delivery pipeline.

12. The continuous delivery advisor as recited in claim 9, wherein said set of previous patterns of sequences of binary events comprises patterns that did not successfully complete said continuous delivery pipeline.

13. The continuous delivery advisor as recited in claim 9, wherein each of said one or more confidence scores generated by said model comprises a percentage.

14. The continuous delivery advisor as recited in claim 9, wherein a binary event of each stage is one or more of the following: number of lines added being larger than an average added number of lines, recency of committed files longer than an average recency, frequency of committed files lager than an average frequency, length of a commit message longer than an average length, a code construct previously rejected in a code review, and a new package or library added.

15. The continuous delivery advisor as recited in claim 9, wherein the program instructions of the computer program further comprise:

detecting a binary event using natural language processing.

16. The continuous delivery advisor as recited in claim 9, wherein said notification comprises said one or more of said one or more confidence scores generated by said model being below said threshold value supported by a pull request comment.

* * * * *